(12) United States Patent
Jin

(10) Patent No.: US 8,388,330 B2
(45) Date of Patent: Mar. 5, 2013

(54) IN-MOULD COATING DEVICE

(76) Inventor: Yu-Syuan Jin, Taipei County (TW)

( * ) Notice: Subject to any disclaimer, the term of this patent is extended or adjusted under 35 U.S.C. 154(b) by 0 days.

(21) Appl. No.: 13/078,452

(22) Filed: Apr. 1, 2011

(65) Prior Publication Data

US 2011/0174218 A1  Jul. 21, 2011

Related U.S. Application Data (63) Continuation-in-part of application No. 12/704,660, filed on Feb. 12, 2010, now abandoned, which is a continuation-in-part of application No. 12/049,271, filed on Mar. 15, 2008, now abandoned.

(30) Foreign Application Priority Data

Mar. 20, 2007  (TW) ................................ 96109478 A (51) Int. Cl.
*B23B 3/10* (2006.01)
(52) U.S. Cl. ...................... 425/112; 425/174.4; 264/255; 264/496
(58) Field of Classification Search .................. 264/496, 264/255, 494, 293, 40.1; 425/112, 174.4, 425/169, 173
See application file for complete search history.

(56) References Cited

U.S. PATENT DOCUMENTS

| | | | | |
|---|---|---|---|---|
| 4,841,364 | A | * | 6/1989 | Kosaka et al. ................... 348/86 |
| 6,699,413 | B2 | * | 3/2004 | Kachnic ........................ 264/40.1 |
| 7,175,408 | B2 | * | 2/2007 | Watanabe et al. .............. 425/169 |
| 2002/0044749 | A1 | * | 4/2002 | Koike et al. ...................... 385/95 |
| 2002/0066407 | A1 | * | 6/2002 | Shibata et al. ................. 118/688 |
| 2004/0146596 | A1 | * | 7/2004 | Shibata et al. ................. 425/116 |

FOREIGN PATENT DOCUMENTS

JP      08054530 A  *  2/1996
TW     200936354    *  9/2009

* cited by examiner

*Primary Examiner* — Yogendra Gupta
*Assistant Examiner* — Ninh Le (57) ABSTRACT

An in-mold coating device comprises a fixed insert, a light generator, a camera, a light sensor, a bolster, a moving insert, the fixed insert is disposed in a fixed plate, the light generator, camera and light sensor are disposed in the fixed insert and equipped with on-off and control wires, the bolster is attached to a bottom of the fixed insert to fix the fixed insert, the camera and light sensor; the fixed inserted is made of transparent material selected from the group consisting of quartz, glass, crystal and coated with a reflective layer on an outer surface thereof, light generated from the light generator is reflected by the reflective layer, photo-curing coating materials are injected into a clearance between the fixed insert and the moving insert and irradiated by the light directly generated from the light generator and multidirectional light reflected by the reflective layer.

2 Claims, 7 Drawing Sheets

IN-MOULD COATING DEVICE

This application is a continuation in part of U.S. patent application Ser. No. 12/704,660, filed on Feb. 12, 2010, now abandoned, which is a continuation in part of U.S. patent application Ser. No. 12/049,271, filed on Mar. 15, 2008, now abandoned, which claims foreign priority to Taiwan Patent Application No. 096109478 filed on Mar. 20, 2007.

BACKGROUND OF THE INVENTION

1. Field of the Invention

The present invention relates to an in-mould coating device, and more particularly to an in-mould coating device, which can form a coating film on the surface of a semi-finished product in mould by irradiating a liquid lacquer or other liquid coating materials injected into the mould.

2. Description of the Prior Art

A conventional in-mould coating method (disclosed in TW Patent Application No. 093135078) is heating liquid lacquer to harden it by use of heating wire or other heating methods to form a coating film on the surface of an injection molding semi-finished product. However, the above conventional method has the following disadvantages: it is required to additionally develop a thermosetting liquid lacquer and; it is likely to cause uneven control temperature and uneven hardening: when the heating wire or other heating methods is used, the liquid lacquer is heated to solidify via steel mould insert by heat conduction in such a manner that the coating film can be combined on the surface of the injection molding product.

Figure 5:
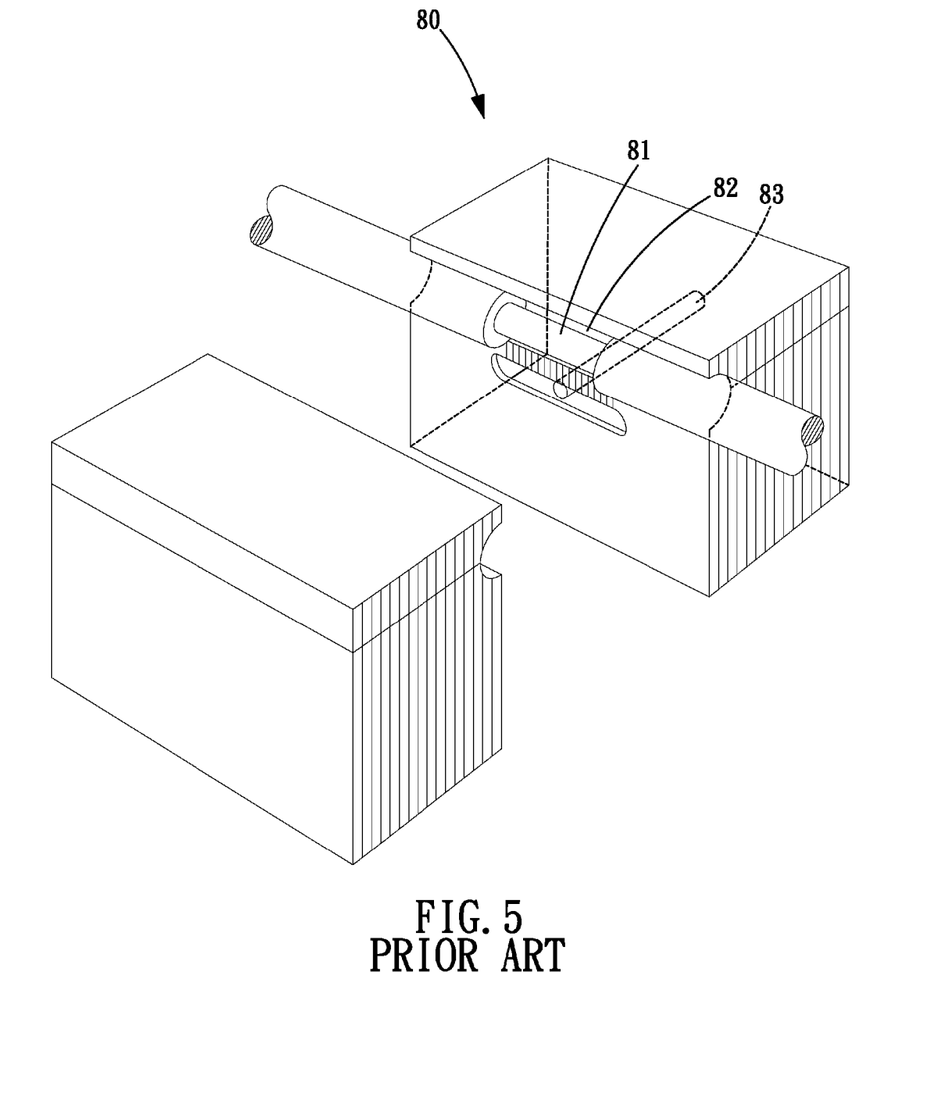
FIG. 5 is a perspective view of a conventional optical fiber coating device.
Figure 6:
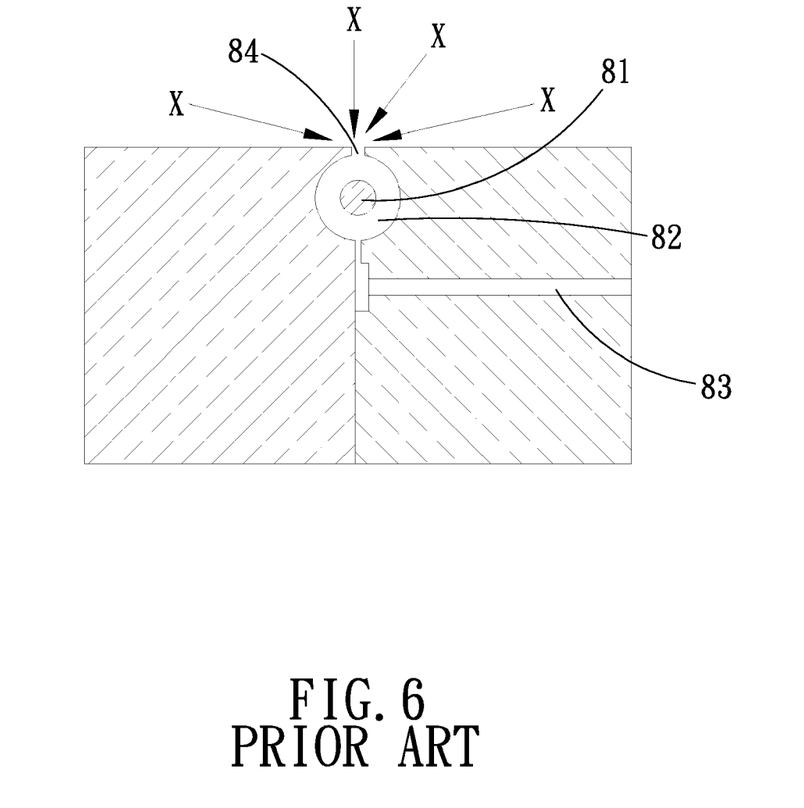
FIG. 6 is a cross sectional view of the conventional optical fiber coating device.

Referring then to FIGS. 5 and 6, an optical fiber coating device 80 is shown, wherein the optical fiber 81 is placed in the molding cavity 82, and then photo-curing resin is fed through the feed-in pipe 83, meanwhile, UV light X passes through an interval 84 to harden the photo-curing resin. However, only the photo-curing resin close to the interval 84 can be hardened since the UV light can only reach the part of the molding cavity 82 close to the interval 84, therefore, the curing of the resin is nonuniform.

It needs to form a plurality of intervals 84 around the molding cavity 82 in order to have a uniform curing of the resin, however, the molding cavity 82 is used to receive photo-curing resin, so it will have the resin leakage problem if the intervals 84 are formed in the sidewall or below the molding cavity 82. Even if there is no resin leakage problem, too many intervals 84 will only make the light irradiation more uneven, so that the curing of the resin is still nonuniform.

Furthermore, even if the optical fiber 81 is used as a light source to introduce light directly into the cavity, however, it still cannot irradiate the photo-curing resin evenly due to the optical fiber 81 is a straight line, and if optical fiber 82 is arranged all over the molding cavity 82, there will be no space left for other necessary equipments.

Figure 7:
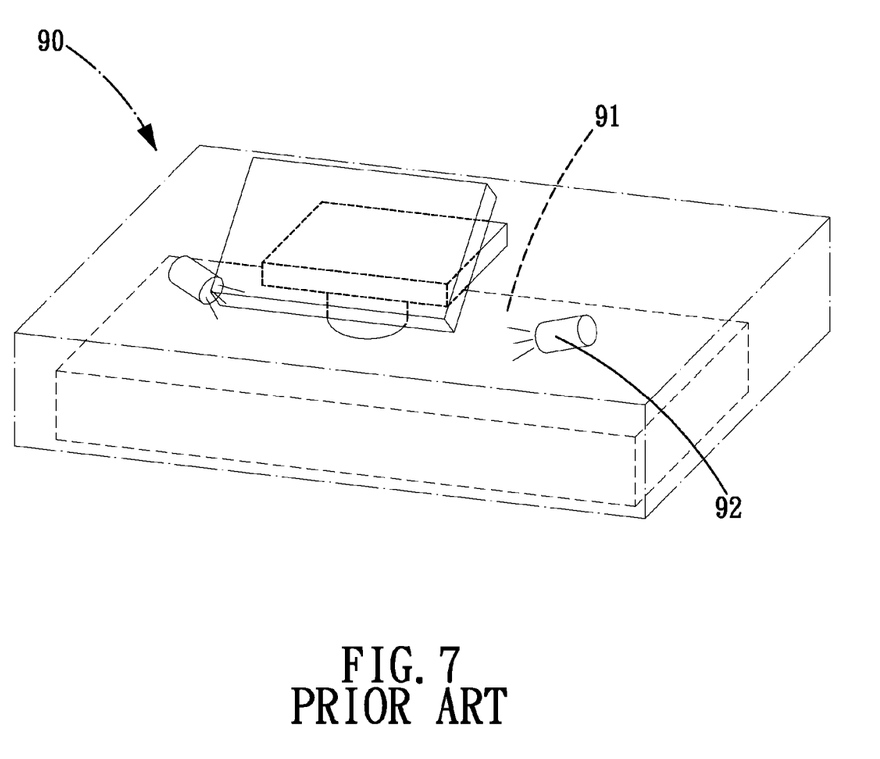
FIG. 7 shows another type of conventional optical fiber coating device.

Referring then to FIG. 7, another type of optical fiber coating device 90 is provided with a camera 92 to monitor the condition inside the molding cavity 91, however, the camera 92 can only monitor but is still unable to solve the problem of the nonuniform curing.

The present invention has arisen to mitigate and/or obviate the afore-mentioned disadvantages.

SUMMARY OF THE INVENTION

The primary objective of the present invention is to provide a device which can apply a liquid lacquer capable of being hardened by the light within the range from the invisible light to the visible light or a common thermosetting liquid lacquer to form a coating film on a semi-finished product formed by injection molding or other processes in mould.

The present invention injects a predetermined amount of liquid lacquer or other liquid coatings in the mould and then irradiates a predetermined amount of light to harden it, so that the semi-finished product placed in the mould can be coated with a coating film on the surface thereof.

In order to achieve the above objectives, the inserts of the mould are made of transparent material (such as quartz, glass, crystal, etc). In the transparent insert are installed at least one light generator (such as UV light, infrared ray, etc), cameras, light sensors, cooling water pipes, etc. The transparent insert is coated with a reflective layer on the outer surface thereof. A bolster is attached to the bottom of the transparent insert for fixing the cameras and the light sensors.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
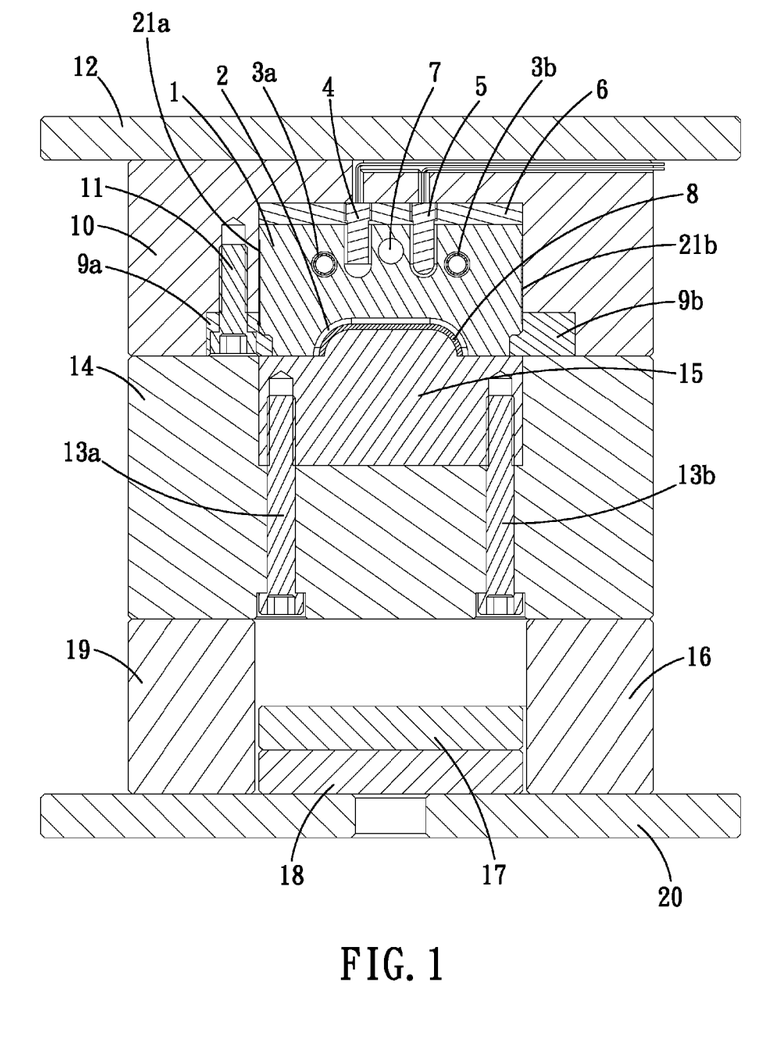
FIG. 1 is a longitudinal cross-sectional view of: a mould in accordance with the present invention.

Referring to FIG. 1 an in-mould coating device in accordance with a preferred embodiment of the present invention comprises: a fixed plate 10, a moving plate 14, a fixed insert 1, a moving insert 15, insert-fixing plates 9a, 9b, a fixed retainer 12, a moving retainer 20, a plurality of spacer blocks 16, 19, an upper ejector plate 17, an lower ejector plate 18, and reflection layers 21a, 21b, 21c and 21d. The fixed insert 1 is also fixed in the cavity of the fixed plate 10 by a plurality of screws 11, and a bolster 6 is attached to the bottom of the fixed plate 10. The moving insert 15 is locked on the moving plate 14 by a plurality of screws 13a, 13b in such a manner that the moving insert 15 is located opposite the fixed insert 1, and the moving retainer 20 is located at one side of the moving plate 14. Additionally, the fixed insert 1 of the present invention is made of transparent material (such as quartz, glass, crystal, etc) and then coated with the reflective layers 21a, 21b on the outer surface thereof. After that, more than one light generator 3a, 3b is assembled inside the fixed insert 1 according to the requirements of the mould design, the direct light source R1 generated from the light generators 3a, 3b is projected onto and reflected by the reflective layers 21a, 21b to form multi-directional reflected light source R2. At the same moment, after being further fixed in advance with more than one camera 4 and more than one light sensor 5, the above bolster 6 is inserted in the transparent fixed insert 1, and the plurality of screws 11 is then used to lock the fixed insert 1 to the fixed plate 10. After the transparent fixed insert 1 is locked, its inner equipments, such as the light generators 3a, 3b, the cameras 4 and the light sensors 5, will be equipped with the on-off and control wires, finishing the assembly of the in-mould coating device of the present invention.

When the mould of the present invention performs the coating on the surface of an injection molding semi-finished product 8 to form a coating film, it comprises the following steps:

The injection molding semi-finished product 8 is placed on the moving insert 15 of the mould first (as shown in FIG. 1).

Subsequently, the mould will be closed, the liquid lacquer or other liquid coating materials will be injected into the clearance between the transparent fixed insert 1 and the injection molding semi-finished product 8.

The camera 4 will be used to monitor the filling state.

Figure 2:
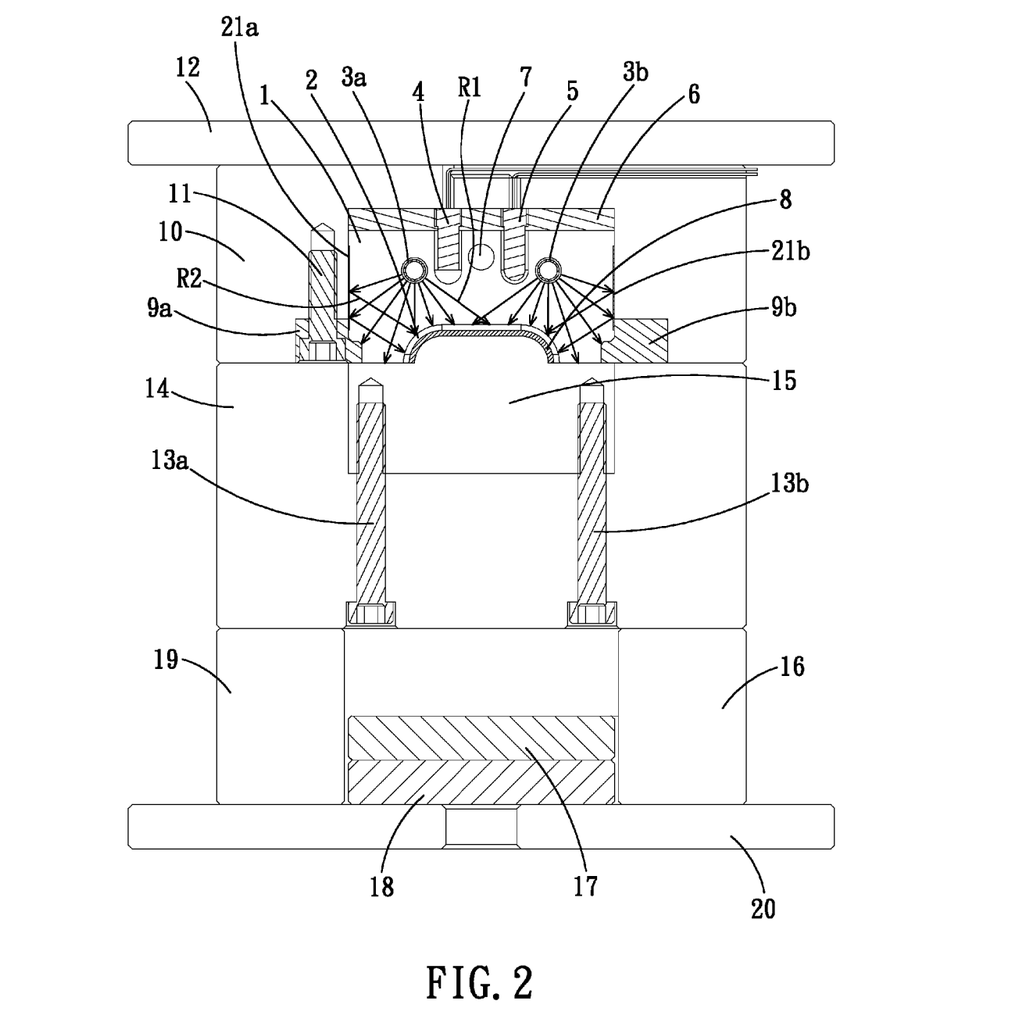
FIG. 2 shows the light generated by the light generators and reflected from the reflective layers of FIG. 1.

After the injection is finished, the light generators 3a, 3b will generate direct light source R1, and then the direct light R1 will be reflected by the reflective layers 21a, 21b to produce the multidirectional reflected light source R2 which is evenly projected on the coating material, such that the coating material is simultaneously irradiated by the direct light source R1 and the multidirectional reflected light source R2, as shown in FIG. 2.

The light sensor 5 will then be used to monitor the amount of light irradiated on the injected liquid lacquer or other liquid coating materials. After the complete hardening of the liquid lacquer, a coating film 2 can be formed on the outside surface of the injection molding semi-finished product, achieving the desired appearance and function of the finished product. The liquid lacquer or other liquid coating material is a photocuring material which can be hardened to form a coating film when subjected to light radiation and can produce different colors in different areas of the coating film by changing the amounts of light generated from the light generators, and since the light to cure the coating material includes the direct light source R1 generated by the light generators 3a, 3b and the multidirectional reflected light source R2 reflected by the reflective layers 21a, 21b, the coating material can be evenly cured, and the formed coating film 2 consequently has a uniform thickness.

Figure 3:
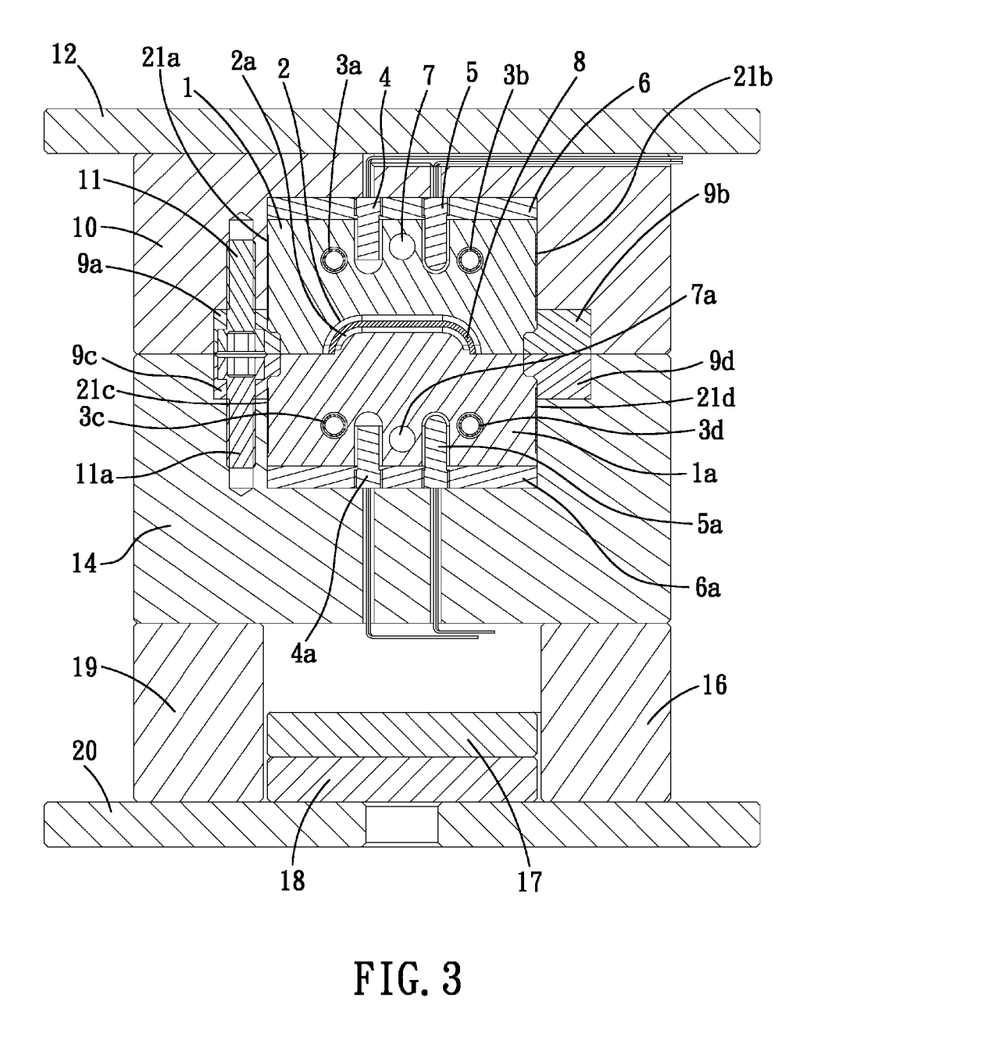
FIG. 3 is a longitudinal cross-sectional view of another in-mould coating device in accordance with the present invention.
Figure 4:
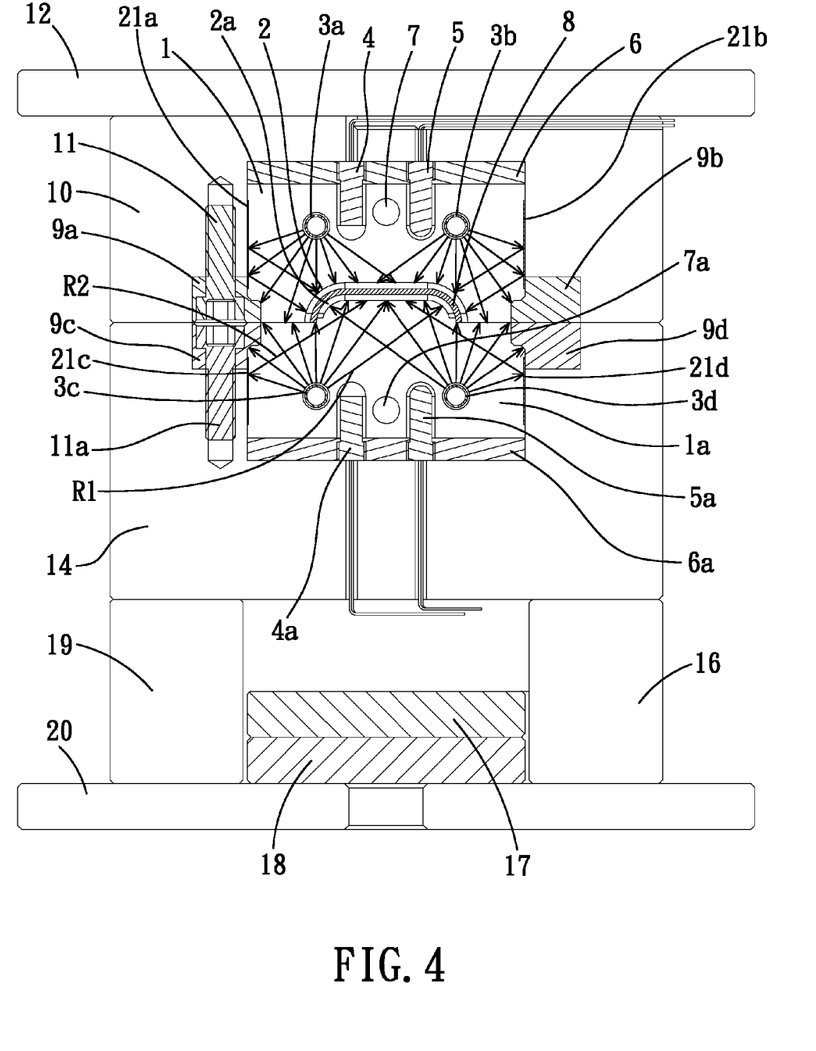
FIG. 4 shows the light generated by the light generators and reflected from the reflective layers of FIG. 3.

Further, FIGS. 3 and 4 show an in-mould coating device in accordance with another embodiment of the present invention. The moving insert 1a is made of transparent material as described above and coated with the reflective layers 21c, 21d on the both sides of the outer surface thereof. After that, a predetermined number of light generators 3c, 3d, cameras 4a and light sensors 5a are installed in the transparent moving insert 1a, and then the on-off and control wires will be equipped (not shown). Finally, the bolster 6a fixed with the cameras 4a and the light sensors 5a is attached to the bottom of the moving insert 1a, and the insert-fixing plates 9c, 9d are then used to lock the moving insert 1a in the cavity of the moving plate 14 by a plurality of screws 11a, finishing the assembly of the in-mould coating device of the present invention.

Thereby, by applying the above method, an injection molding semi-finished product 8 is placed on the moving insert 1a, and the liquid lacquer or other liquid coating materials is injected into the clearance therebetween for coating the "inside surface" of the injection molding semi-finished product 8 with a coating film 2a. For the same reason, the in-mould coating device of the present invention can also be as shown in FIGS. 3 and 4 completely. By such arrangements, the above method can be used to form a coating film 2, 2a on each of the "inside" and the "outside" surfaces of an injection molding semi-finished product 8 synchronously.

Additionally, an injection molding semi-finished product 8 is placed on the transparent fixed insert 1 or moving insert 1a of the mould of the present invention by the following two ways. 1. Forming a semi-finished product 8 by injection molding or other processes (such as extrusion molding process, or vacuum forming process, etc), then placing the semi-finished product 8 on the transparent fixed or moving inserts 1, 1a of the present invention; 2. By way of double injection moulds, fixing both the injection mould of semi-finished product and the mould of the present invention on an injection molding machine capable of rotating or moving; next, forming an injection semi-finished product 8 first by the injection mould of semi-finished product, and then placing the injection semi-finished product 8 on the transparent fixed or moving inserts 1, 1a of the injection mould of the present invention after mould opening; and finally, closing mould again. In addition, the representative symbols 7, 7a as shown in FIGS. 1-4 are the cooling water pipes of the injection moulds in accordance with two embodiments of the present invention, respectively.

In addition, the in-mould coating device of the present invention can also be obtained by the methods as follows:

1. More than one light generator 3a, 3b, 3c, or 3d on the in-mould coating device of the present invention can produce direct light source R1 and can also be disposed on other mould parts besides the transparent fixed or moving inserts 1 or 1a.

2. The in-mould coating device of the present invention can be provided with a reflective layers 21a, 21b, 21c and 21d at the outer surface of the finished product of the fixed or moving inserts 1 or 1a for adequately reflecting the light from the light generators 3a, 3b, 3c or 3d to the surface of the semi-finished product 8.

3. If the injection molding semi-finished product 8 has hooks or a complicated shape or configuration, the fixed or moving inserts 1 or 1a of the in-mould coating device of the present invention can be provided with other demoulding mechanisms (not shown), which can also be made of transparent material such as quartz, glass, crystal (if necessary).

While we have shown and described various embodiments in accordance with the present invention, it is clear to those skilled in the art that further embodiments may be made without departing from the scope of the present invention.

What is claimed is:

1. An in-mould coating device comprising a fixed insert, a light generator, a camera, a light sensor, a bolster, a moving insert; the fixed insert being disposed in a fixed plate; the light generator, the camera and the light sensor being disposed in the fixed insert and equipped with control wires, the bolster being attached to a bottom of the fixed insert to fix the fixed insert and the camera and light sensor; the in-mould coating device being characterized in that: the fixed insert being made of transparent material selected from the group consisting of quartz, glass, crystal and coated with a reflective layer on an outer surface thereof; light generated from the light generator being reflected by the reflective layer; photo-curing coating materials being injected into a clearance between the fixed insert and the moving insert and irradiated by the light directly generated from the light generator and multidirectional light reflected by the reflective layer.

2. The in-mould coating device as claimed in claim 1, wherein the moving insert of the in-mould coating device is made of transparent material selected from the group consisting of quartz, glass, crystal and is provided on its outer surface with a reflective layer, and light generated from the light generator is reflected by the reflective layer of the moving insert; photo-curing coating materials are injected into the clearance between the fixed insert and the moving insert and irradiated by the light directly generated from the light generator and multidirectional light reflected by the reflective layer of the moving insert.

\* \* \* \* \*